(No Model.)　　　　　　　　　　　　　　　　　　　　2 Sheets—Sheet 1.
J. ERNST.
BORING MACHINE.
No. 324,100.　　　　　　　　　　　Patented Aug. 11, 1885.
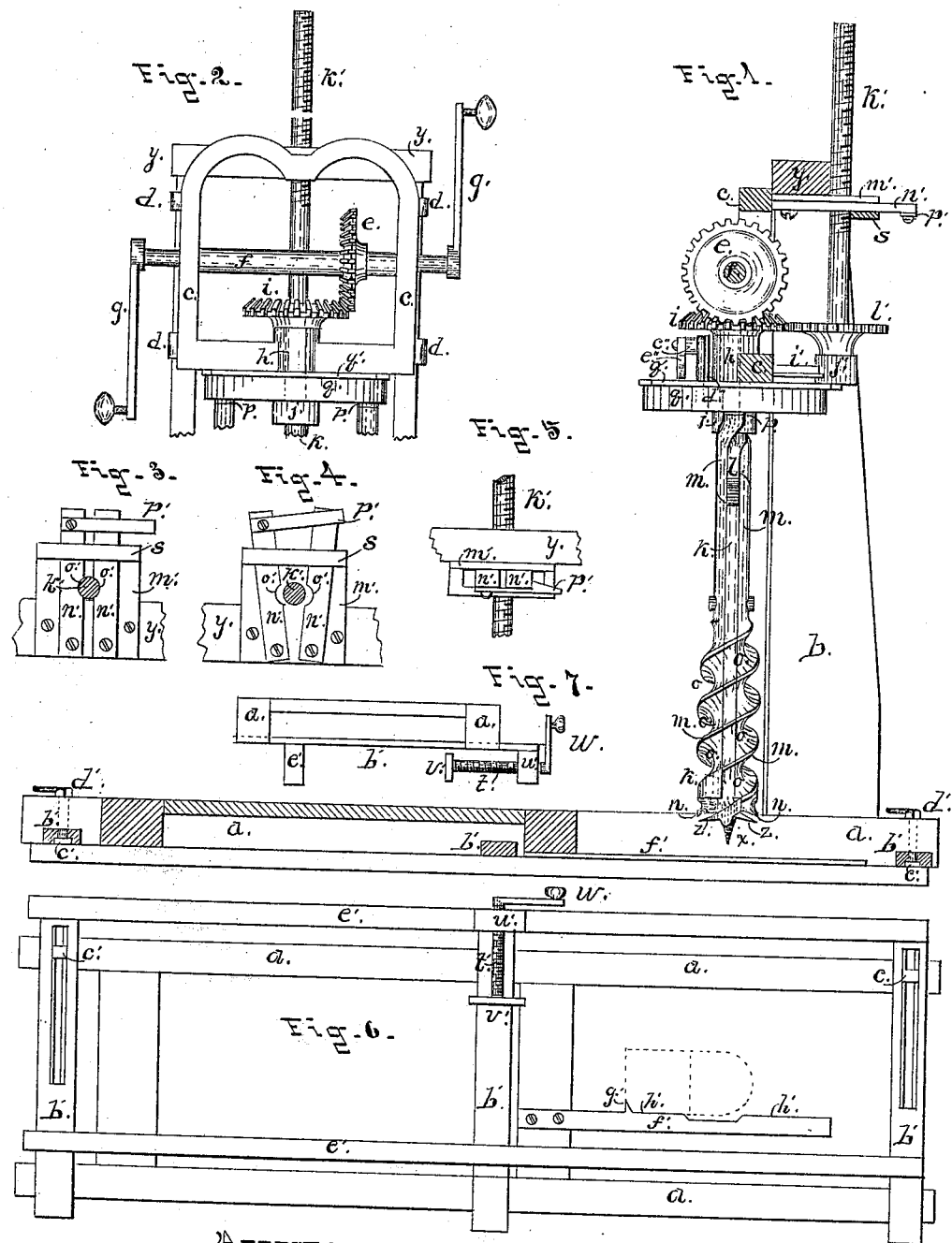

(No Model.) 2 Sheets—Sheet 2.
J. ERNST.
BORING MACHINE.
No. 324,100. Patented Aug. 11, 1885.
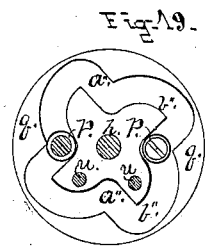
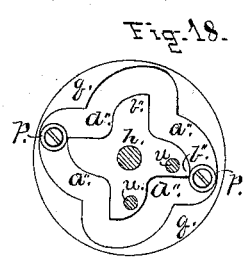
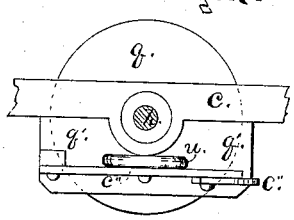
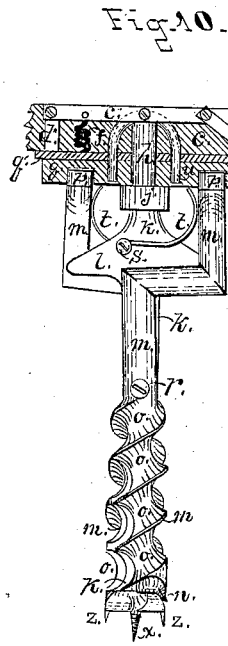
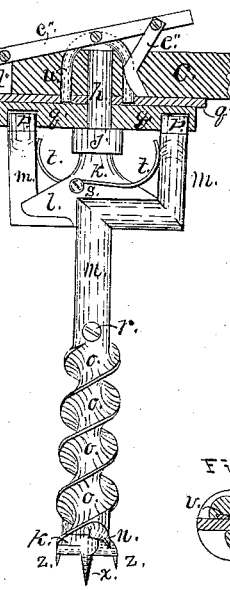
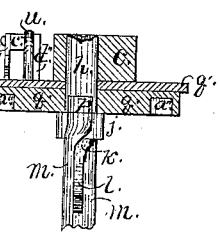
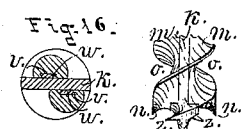
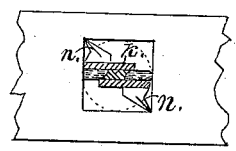
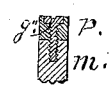
ATTEST:
M. R. Thomas
A. Z. Thomas
INVENTOR:
John Ernst.
By James E. Thomas
Attorney.
N. PETERS, Photo-Lithographer, Washington, D. C.

UNITED STATES PATENT OFFICE.

JOHN ERNST, OF BAY CITY, MICHIGAN.

BORING-MACHINE.

SPECIFICATION forming part of Letters Patent No. 324,100, dated August 11, 1885.

Application filed January 3, 1885. (No model.)

*To all whom it may concern:*

Be it known that I, JOHN ERNST, a citizen of the United States, and a resident of Bay City, in the county of Bay and State of Michigan, have invented a new and useful Improvement in Boring-Machines, of which the following is a specification.

The objects of my invention are, first, to provide a machine and cutting-tool by means of which a hole of irregular form—as square or elliptical—may be bored, as well as a round hole; and, second, to produce a mechanism by which tenons and mortises can be worked to the proper size and shape without being entirely marked out on the timber, as is usually necessary, and avoid turning over the timber.

My invention consists, chiefly, in the combination and arrangement of a boring-tool constructed so that by means of a stationary cam cutters are caused to move outward and inward as they are revolved, a gate which carries the said cutting-tool and cam, and mechanism for properly revolving the said tool, means for propelling the tool into the timber to be worked, and guides for adjusting the machine, as is hereinafter more fully described and claimed.

In the drawings, Figure 1 is a side view, partly sectional, of a boring-machine embodying my invention. Fig. 2 is a front view of the upper portion of the same. Fig. 3 is a detached view of the under side of a divided nut, a side view of which is shown in Fig. 1, showing the nut closed. Fig. 4 is a view of the same, showing the nut open. Fig. 5 is an end view of Fig. 3. Fig. 6 is a view of the under side of the frame, and shows attached thereto a guide. Fig. 7 is an end view of the same. Fig. 8 is a detached view of my improved boring-tool, showing the cutters in proper position for boring a round hole. Fig. 10 is a view of the same, with the cutters extended as for cutting the corners of a square hole. Figs. 9, 14, and 15 are a side view of the boring-tool, partly sectional. Fig. 11 is a sectional view of the boring-tool, showing the cutters extended for boring a square hole. Fig. 12 is the same, showing the cutters in position for boring a round hole. Fig. 13 is a sectional view of the friction-roller. Fig. 16 is a sectional view of the tool near its cutters. Figs. 17, 18, and 19 are views of the cam-plate.

Similar letters refer to similar parts throughout the several views.

$a$ represents the horizontal bed-pieces of a frame, and $b$ are vertical standards attached at their lower ends to the bed-pieces $a$, and provided at their front edges with suitable guide-plates, which carry the gate $c$, which is attached thereto by the hooked lugs $d$, and allows the gate $c$ to move vertically. Across the gate $c$, and passed through suitable boxes and carrying the miter gear-wheel $e$, is placed the horizontal shaft $f$, which is also provided at its outer ends with the cranks $g$, placed in proper bearings; and in the central part of the gate $c$ is the vertical shaft $h$, provided at its upper end with the miter gear-wheel $i$, which intermeshes with the wheel $e$, and at the lower end of the shaft is provided a socket, $j$, for holding the middle or rigid portion, $k$, of the boring-tool. This part $k$ is provided on opposite sides with flat or level surfaces which extend to nearly its whole length, and is also provided near its top end with the laterally-extending arms $l$, and at its lower ends with the usual leading-screw, $x$, and cutting-edges $z$ of a common auger. Secured to the central part, $k$, by the pivot $r$, and fitting directly upon the flat surfaces thereof, are placed the oscillating levers $m$, fitted at their lower ends to conform to the shape of the central part, $k$, and provided with suitable cutters, $n$, the said levers $m$ being provided at their inner sides with the dovetail groove $v$, into which the upward-extending shank $w$ of the said cutters $n$ is fitted and secured. The lower portion of both the rigid part $k$ and levers $m$ is provided with the spiral groove $o$, which is cut into all the said parts to form a continuous spiral groove, and operates when the tool is revolved to carry out the chips and prevent the tool from clogging. Near their upper ends the levers $m$ are turned outward in opposite directions to a proper distance and are then again turned upward, leaving the outward-extending portion to bear upon the arms $l$, and at their upward-extending ends are provided with the rollers $p$, which are arranged to travel within the cam-groove $a''$ in the plate $q$, which is secured in a horizontal position to the lower or under side of the gate $c$; and as the boring-tool is revolved the rollers $p$ follow the course of the cam-groove $a''$, and the levers $m$ are caused to oscillate upon the pivot $r$, and the cutters $n$ extend and recede and cut the corners of a square hole just after the cutting-edges $z$ have cut a round hole.

To assist the rollers $p$ to travel easily in the groove $a''$, and to turn the corners in the same quickly and easily, I place the springs $t$ with one free end bearing against the upward-extending arm of the lever $m$, and the other or opposite end secured to the central piece, $k$, by the screw $s$, so that the free ends of the springs will act to press outward upon the upper part of the levers $m$ and cause the rollers $p$ to pass easily around the corners $b''$ of the groove $a''$, and also serve to hold the rollers $p$ firmly against the outside part of the groove $a''$. As may be plainly seen, the shape of the cam-groove $a''$ regulates the form of the hole cut by the tool. The form shown in Figs. 18 and 19 operates the tool to cut a square hole, and by changing the form of the cam-groove a hole of different form may be produced.

The cam-plate $q$ consists of two portions, one part, $q$, which contains the groove $a''$, and through the center of which passes the vertical shaft $h$, and is located just beneath the rigid part $q'$, which is rigidly attached to the lower part of the gate $c$; and to prevent the part $q'$ from revolving with the boring-tool, holes are provided in both the plates $q'$ and $q$ in alignment with each other, and through these holes are passed the bolts $u$, the upper ends of which are bent in the form of a yoke and pivoted to the lever $c''$, one end of the lever $c''$ being pivoted to the standard $d''$, and the opposite end being free to be raised or lowered, and provided with a prop, $e''$, which, when the lever is raised, rests with its lower end on the cam-plate $q'$, and the bolts $u$ are held out of engagement with the lower plate, $q$, but with their points still within the holes in the plate $q'$, so that the plate $q$ may revolve with the boring-tool, and the springs pressing the rollers P into the outer corners of the cam-groove $a''$ allow the cutters $n$ to be drawn in and remain without cutting, when a round hole will be formed. With one end attached to the lever $c''$, and with its opposite end secured to the plate $q'$, is the spiral spring $f$, which serves to pull the lever down when the prop $e''$ is released.

As shown in Figs. 6 and 7, upon the bottom of the bed-pieces $a$ is placed a guide for adjusting the machine to the proper position for boring, and consists of the slotted cross-pieces $b'$, which are held to the bed-pieces $a$ by the bolts $c'$, which pass through the slotted pieces $b'$ and bed-pieces $a$ and are secured by the nuts $d'$. These slotted cross-pieces $b'$ extend beyond the sides of the bed-pieces $a$, and at their outer ends are rigidly attached to the guide-pieces $e'$ in such a manner that the guide-pieces shall extend below the cross-bars $b'$. Upon one of the guide-pieces is placed the projecting piece $u'$, through which is passed the screw $t'$, the inner end of the screw $t'$ being provided with the clamping-piece $v'$, and the opposite end is provided with a crank, $w'$. The slots in the bars $b'$ admit of a lateral adjustment of the guide-pieces, and when the guides are properly adjusted the machine is placed upon the stick to be mortised, with one of the guide-pieces bearing against the side of the said stick, and then the screw $t'$ is turned until the clamping-piece $v'$ is firmly held against the opposite side of the timber, when the tool will cut in the position designed.

To the bottom of the frame, between the bed-pieces $a$, and extending forward beyond the boring-tool and with its inner edge, $h'$, in alignment with the side of the tool, is attached the guide $f'$, and projecting from the said inner edge, $h'$, thereof is the pointer $g'$. This pointer $g'$ is located in front of the boring-tool, and at such a distance from the same as the size of the tool, so that when one hole shall have been bored the machine may be adjusted for boring the next hole by moving the machine forward until the pointer $g'$ reaches the edge of the hole last bored, when the tool will bore just beyond the first hole and cut to the said first hole, making a continuous mortise, without marking or laying out lines on the timber except a mark for starting. The guide $f'$ is also useful to adjust the machine when lines for describing the hole to be made are laid on the timber, as by placing the inner edge, $h'$, of the guide $f'$ on the line marked out, the tool will cut directly to that line. The back part of the gate $c$ is provided with the projecting part $i'$, the outer end of which terminates with the bearing $j'$, and into the bearing $j'$ is placed the vertical screw $k'$. Upon the lower portion of the screw $k'$, and just above the bearing $j'$, is rigidly fastened the gear-wheel $l'$, which engages with the gear-wheel $i$, and imparts motion to the screw, which extends above the bearing $j'$ to some distance, and has its upward-extending part provided with a thread similar in size to that on the leading-screw $x$.

Firmly secured to the cross-pieces $y$, and provided with a hole through which passes the screw $k'$, is the plate $m'$; and pivoted near the front edge of this plate $m'$, and extending considerably beyond the back edge of the said plate $m'$ and at opposite sides of the screw $k'$, are the levers $n'$. A portion, $o'$, of the levers $n'$ is cut away and is provided with a screw-thread, and is adapted to engage with the screw $k'$ when the levers are held together, and to allow the screw to pass without engagement when the levers are held apart.

Firmly secured to the projecting end of one of the levers $n'$ is one end of the spring $p'$, the opposite end being provided with a catch, $r'$, adapted to catch over the other lever, $n'$, and hold the levers firmly in engagement with the screw $k'$. Just back of the screw $k'$ and across beneath the levers $n'$ is placed the supporting-piece $s$, the outer ends of which extend beyond the levers $n'$ and are secured to the plate $m'$, and serve to support the levers $n'$ and to regulate the distance they may be spread apart.

The operation of the screw $k'$ is to assist in forcing the boring-tool into knotty or very hard timber and to propel the tool entirely through the timber.

What I claim as my invention, and desire to secure by Letters Patent, is—

1. In a boring-tool, the central part, $k$, having on its upper portion the laterally-extended arms $l$, and at its lower end the leading-screw $x$ and cutting-edges $z$, the levers $m$, attached to the said part $k$ by the pivot $r$, and provided at their upper ends with the rollers $p$, in combination with the plate $q$, provided with the cam-groove $a''$, adapted to engage with the said rollers $p$ and cause the said levers $m$ to oscillate, substantially as and for the purpose set forth.

2. In a boring-tool, the central part, $k$, provided with a leading-screw and cutting-edges at its lower end, and with its upper end attached to the socket $j$, and mechanism for revolving the same, in combination with the levers $m$, pivoted to the said part $k$, and provided at their lower ends with the cutters $n$, and at their upper ends with the rollers $p$, substantially as described, and for the purpose set forth.

3. In the within-described boring-tool, the combination of the central part, $k$, having the arms $l$ near its upper end, and the levers $m$, pivoted to the said part $k$ and provided at their lower ends with the cutters $n$ and at their upper ends with the rollers $p$, with the springs $t$, secured to the said part $k$ and adapted to push outward the upper ends of the said levers $m$, substantially as and for the purpose set forth.

4. In a boring-machine, the gate $c$, having the plate $q'$ rigidly attached to the bottom part thereof, and the cam-plate $q$, located just beneath the said plate $q'$, and provided on its under side with the cam-groove $a''$, in combination with the standard $d''$, rigidly secured to the said plate $q'$, the lever $c''$, pivoted at one end to the said standard and provided with the spring $f'''$ and the prop $e''$, and the bolts $u$, having one end pivoted to the said lever $c''$, and the opposite end adapted to pass through holes in the said plates $q'$ and $q$, substantially as specified, and for the purpose set forth.

5. In a boring-machine, the combination of the bed-pieces $a$ with the guide $f'$, attached to the cross-piece supporting the said bed-pieces $a$, and extending beyond the boring-tool, and with one edge, $h'$, in alignment with one side of the said boring-tool, and having a pointer, $g'$, projecting from the said edge $h'$, all arranged substantially as and for the purpose set forth.

6. The combination, in the within-described boring-tool, of the central part, $k$, provided with cutting-edges and leading-screw at its lower end, of the oscillating levers $m$, pivoted to the sides of the said part $k$, and provided at their lower ends with the cutters $n$, with a spiral groove, $o$, cut into the said part $k$ and levers $m$, alternately, in such a manner as to form a continuous spiral groove around all of the said parts, substantially as and for the purpose set forth.

7. In a boring-machine, the bed-pieces $a$, the standards $b$, the gate $c$, sliding vertically on the said standards, the shaft $f$, carrying the cranks $g$ and miter-gear $e$, the vertical shaft $h$, having the socket $j$ at its lower end and gear-wheel $i$ at its upper end, in combination with the cam-plate $q$, attached horizontally to the lower part of the gate $c$, the central part, $k$, attached to the socket $j$, and provided at its lower end with cutting-edges and leading-screw, the springs $t$, and the levers $m$, pivoted to the said part $k$, and provided at their lower ends with the cutters $n$, and at their upper ends with the rollers $p$, substantially as and for the purpose set forth.

8. In a boring-machine, the gate $c$, carrying the shaft $h$ and gear $i$, and having the extended portion $i'$ and box $j'$, the screw $k'$, supported in the said box $j'$, and carrying the gear-wheel $l'$, arranged to engage with the wheel $i$, in combination with the plate $m'$, secured to the upper cross-piece $y$, the levers $n'$, pivoted to the said plate $m'$ and provided with the threaded recesses $o'$, adapted to engage with the screw $k'$, the spring-catch $p'$, rigidly attached to one of the levers $n'$, and adapted to catch over the other lever, $n'$, and the supporting-piece $s'$, substantially as described, and for the purpose set forth.

9. In a boring-machine, the bed-pieces $a$, in combination with the slotted cross-pieces $b'$, the bolts $c'$, provided with the nuts $d'$, the guide-pieces $e'$, secured to the cross-pieces $b'$ and extending below the same, substantially as and for the purpose specified.

JOHN ERNST.

Witnesses:
J. E. THOMAS,
G. H. FRANCIS.